(12) United States Patent
Afshari et al.

(10) Patent No.: US 11,578,461 B2
(45) Date of Patent: Feb. 14, 2023

(54) PAPERS COMPRISING AEROGEL POWDER AND ARAMID POLYMER FIBRILS

(71) Applicant: DUPONT SAFETY & CONSTRUCTION, INC., Wilmington, DE (US)

(72) Inventors: Mehdi Afshari, Midlothian, VA (US); Byoung Sam Kang, Midlothian, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 176 days.

(21) Appl. No.: 17/194,770

(22) Filed: Mar. 8, 2021

(65) Prior Publication Data

US 2021/0363699 A1 Nov. 25, 2021

Related U.S. Application Data

(60) Provisional application No. 62/990,646, filed on Mar. 17, 2020.

(51) Int. Cl.
| | |
|---|---|
| *D21H 13/24* | (2006.01) |
| *H01M 10/658* | (2014.01) |
| *H01M 50/143* | (2021.01) |
| *D21H 21/28* | (2006.01) |
| *D21H 21/34* | (2006.01) |
| *D21H 17/68* | (2006.01) |
| *D21H 27/00* | (2006.01) |

(52) U.S. Cl.
CPC ............ *D21H 13/24* (2013.01); *D21H 3/825* (2013.01); *D21H 5/0002* (2013.01); *D21H 17/68* (2013.01); *D21H 27/00* (2013.01); *H01M 10/658* (2015.04); *H01M 50/143* (2021.01)

(58) Field of Classification Search
CPC ........ D21H 13/26; D21H 13/12; D21H 13/24; D21H 27/10; H01M 8/0239
USPC ...................................................... 162/157.3
See application file for complete search history.

(56) References Cited

U.S. PATENT DOCUMENTS

| | | | |
|---|---|---|---|
| 2,093,454 A | 9/1937 | Kistler | |
| 2,188,007 A | 1/1940 | Kistler | |
| 2,249,767 A | 7/1941 | Kistler | |
| 3,063,966 A | 11/1962 | Louise et al. | |
| 3,227,793 A | 1/1966 | Cipriano | |
| 3,287,324 A | 11/1966 | Wilfred | |
| 3,414,645 A | 12/1968 | Morgan | |
| 3,756,908 A | 9/1973 | Gross | |
| 3,767,756 A | 10/1973 | Blades | |
| 3,869,429 A | 3/1975 | Blades | |
| 3,869,430 A | 3/1975 | Blades | |
| 4,308,374 A | 12/1981 | Vollbracht et al. | |
| 4,698,414 A | 10/1987 | Bair | |
| 5,026,456 A | 6/1991 | Hesler et al. | |
| 5,073,440 A | 12/1991 | Lee et al. | |
| 5,084,136 A | 1/1992 | Haines et al. | |
| 5,094,913 A | 3/1992 | Yang | |
| 5,171,402 A | 12/1992 | Haines et al. | |
| 5,202,184 A | 4/1993 | Brierre et al. | |
| 5,523,034 A | 6/1996 | Lee | |
| 5,532,034 A | 7/1996 | Kirby et al. | |
| 5,667,743 A | 9/1997 | Tai et al. | |
| 8,211,272 B2 | 7/2012 | Levit et al. | |
| 8,518,335 B2 | 8/2013 | Joung et al. | |
| 8,961,919 B2 | 2/2015 | Joung et al. | |
| 2005/0100728 A1* | 5/2005 | Ristic-Lehmann | B32B 15/08 524/544 |
| 2005/0284596 A1 | 12/2005 | Conley et al. | |
| 2006/0113700 A1 | 6/2006 | Hartzler et al. | |
| 2007/0238008 A1 | 10/2007 | Hogan et al. | |
| 2014/0361209 A1* | 12/2014 | Yrieix | C04B 14/064 52/309.1 |
| 2016/0297962 A1* | 10/2016 | Nelson | C08J 3/201 |
| 2016/0362525 A1 | 12/2016 | Teasley et al. | |
| 2017/0015822 A1* | 1/2017 | Nelson | D21H 17/72 |
| 2017/0204258 A1 | 7/2017 | Teasley et al. | |
| 2018/0258259 A1* | 9/2018 | Banerjie | C08L 25/06 |
| 2020/0056332 A1* | 2/2020 | Afshari | D21H 13/12 |

FOREIGN PATENT DOCUMENTS

| | | |
|---|---|---|
| JP | H10130496 A | 5/1998 |
| WO | 2019228972 A1 | 12/2019 |

OTHER PUBLICATIONS

International Search Report and Written Opinion in International Application No. PCT/US2021/022332, dated Jul. 8, 2021.
Li Zhi, et al. "Flexible Silica Aerogel Composites Strengthened with Aramid Fibers and Their Thermal Behavior", Materials & Design, vol. 99, pp. 349-355, Mar. 17, 2016.

* cited by examiner

*Primary Examiner* — Mark Halpern

(57) ABSTRACT

A paper suitable for use in a battery or battery pack as a flame barrier or thermal insulation, the paper comprising 60 to 95 weight percent aerogel powder and 5 to 40 weight aramid polymer fibrils; the paper having a thickness of 50 to 4000 micrometers.

14 Claims, 6 Drawing Sheets

PAPERS COMPRISING AEROGEL POWDER AND ARAMID POLYMER FIBRILS

BACKGROUND OF THE INVENTION

Field of the Invention

This invention relates to a paper suitable for use in a battery cell, a battery module, or a battery pack as a flame barrier or thermal insulation; and a battery cell, a battery module, or a battery pack comprising the paper.

Description of Related Art

The growth of the use of lithium-ion and other batteries in electrical vehicles has been accompanied by an increase in dramatic battery failures involving overheating and fire. There is a need for flame barriers and fire-retardant insulation for uses that include separating battery cells to help prevent overheating and hot spots in one cell from causing the entire battery pack to evolve into a thermal runaway condition that could result in fire or explosion.

In addition, some proposed materials for such insulation have attributes that are undesirable to the manufacturers of batteries. Some insulating materials have a high propensity to shed particles, either in manufacture or in use, which is undesirable in that they create dust and other problems in processes such as those that require high speed automatic adhesive tape application on the surface of insulation. Particle shedding also impacts the bonding between the surface of insulation and the adhesive tape, causing movement and/or misalignment of the insulation due to vibrations (such as road vibrations) most electrical vehicles experience during normal operation. Further, material lost during manufacture is a yield loss and is undesirable.

What is needed are flame barrier structures that can be used in applications needing a flame barrier or thermal insulation, such as various locations in a battery cell, a battery module, or a battery pack, that can provide improved thermal insulation but also have acceptable shedding performance both in manufacture and in use.

BRIEF SUMMARY OF THE INVENTION

This invention relates to a paper suitable for use in a battery or battery pack as a flame barrier or thermal insulation, the paper comprising 60 to 95 weight percent aerogel powder and 5 to 40 weight aramid polymer fibrils; the paper having a thickness of 50 to 4000 micrometers.

DETAILED DESCRIPTION OF THE INVENTION

This invention relates to a paper suitable for use in a battery cell, a battery module, or a battery pack as a flame barrier or thermal insulation; and a battery cell, a battery module, or a battery pack comprising the paper. The paper comprises 60 to 95 weight percent aerogel powder and 5 to 40 weight aramid polymer fibrils; the paper having a thickness of 50 to 4000 micrometers. This high percentage of aerogel powder in the sheet is made possible by the use of aramid polymer fibrils, which are believed to capture or entrap the particles by either entanglement or by forming a mesh structure that will not allow the aerogel powder to be washed out of the structure during papermaking.

The paper comprises 60 to 95 weight percent aerogel powder and 5 to 40 weight percent aramid polymer fibrils, based on the total weight of the aerogel powder and aramid polymer fibrils in the paper. In some embodiments, the paper comprises 65 to 95 weight percent aerogel powder and 5 to 35 weight percent aramid polymer fibrils, based on the total weight of the aerogel powder and aramid polymer fibrils in the paper. In some preferred embodiments, the paper comprises 75 to 95 weight percent aerogel powder and 5 to 25 weight percent aramid polymer fibrils, based on the total weight of the aerogel powder and aramid polymer fibrils in the paper; and in some most preferred embodiments, the paper comprises 80 to 95 weight percent aerogel powder and 5 to 20 weight percent aramid polymer fibrils, based on the total weight of the aerogel powder and aramid polymer fibrils in the paper.

Figure 1:
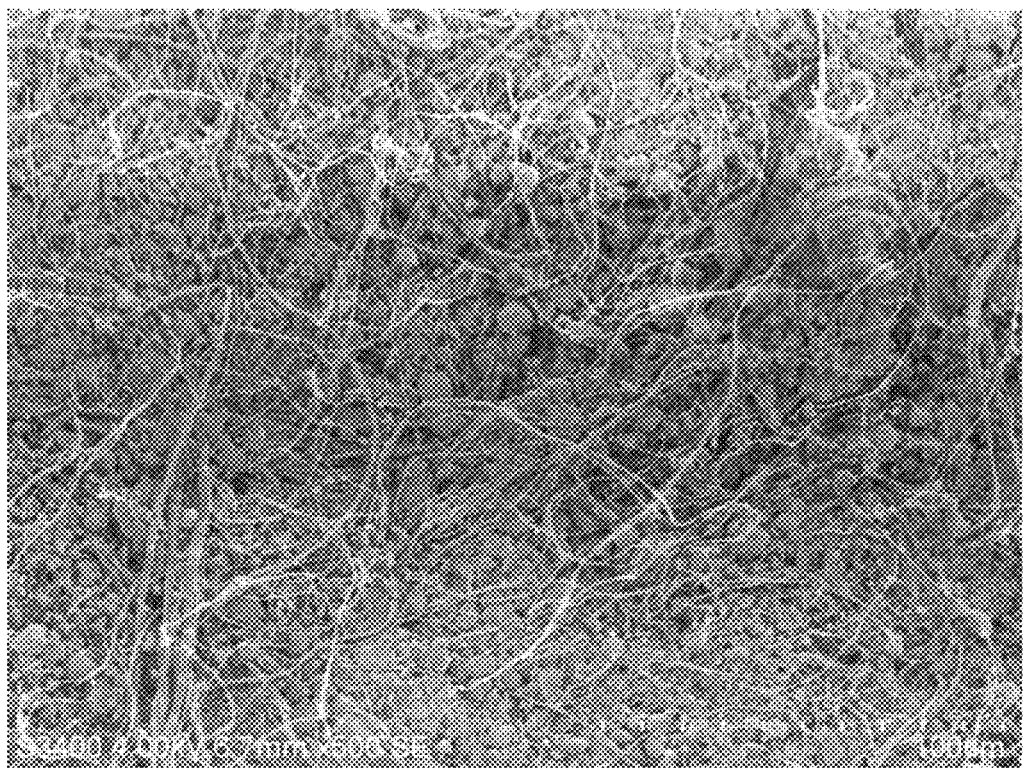
FIGS. 1 & 2 are SEM photos, at 500× and 1000× magnification, respectively, of the surface of a paper made from the combination of aerogel powder and aramid polymer fibrils.
Figure 2:
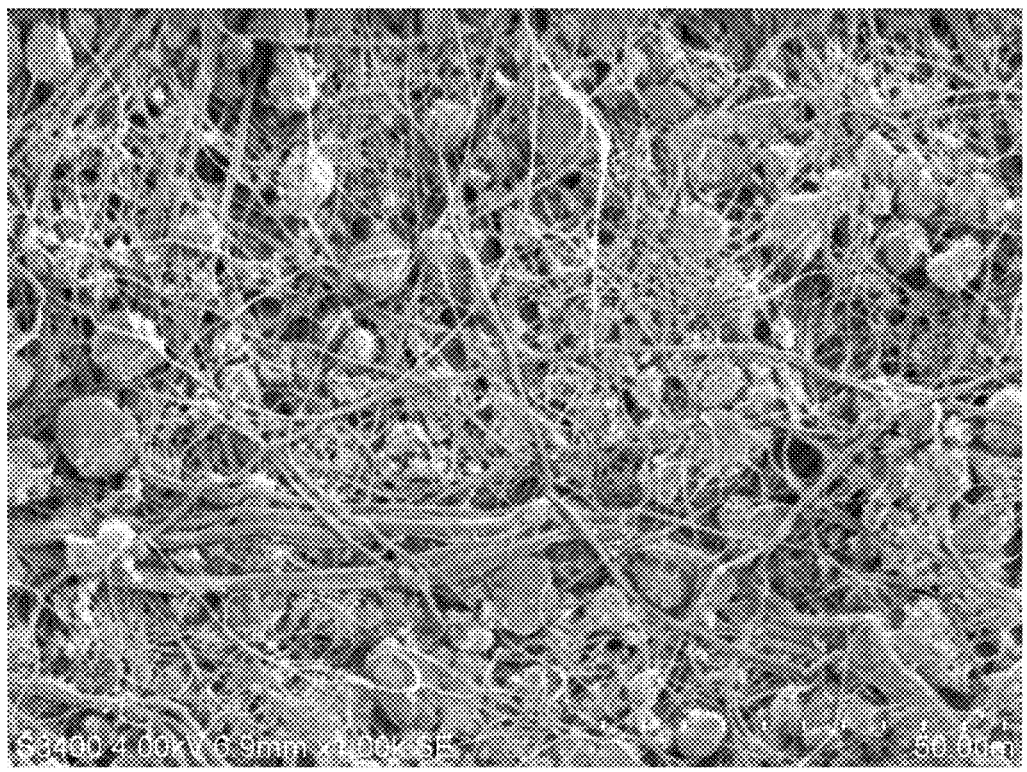
Figure 3:
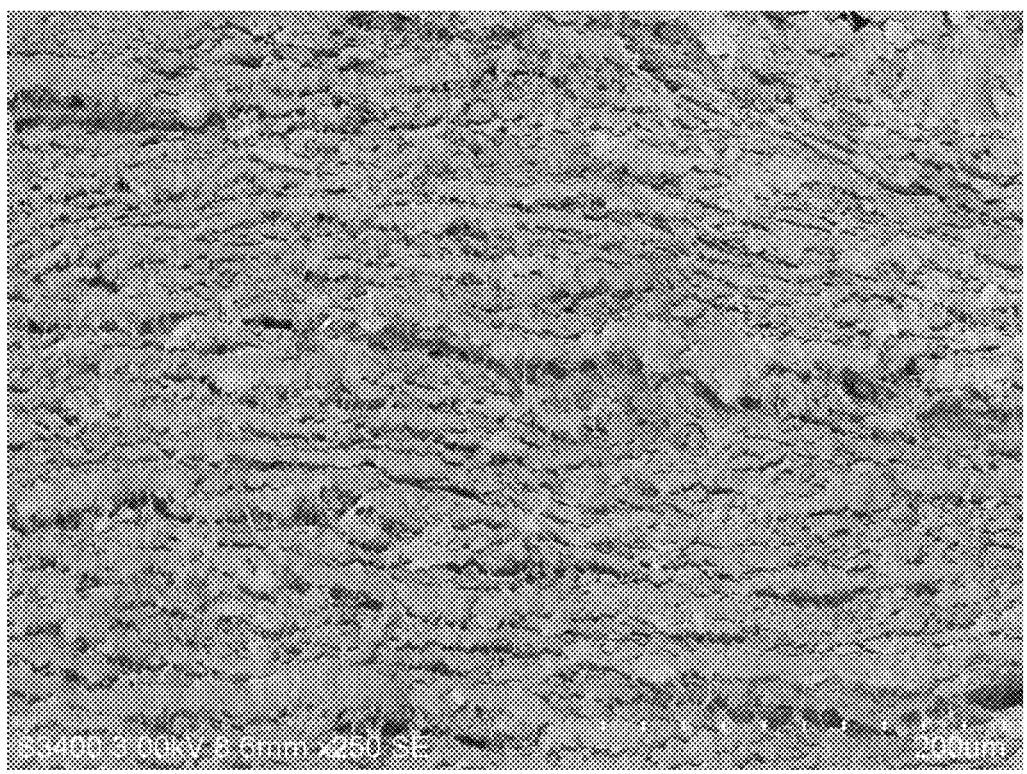
FIGS. 3 & 4 are cross-sectional views, at 500× and 1000× magnification, respectively, of a calendered or densified paper made from the combination of aerogel powder and aramid polymer fibrils.
Figure 4:
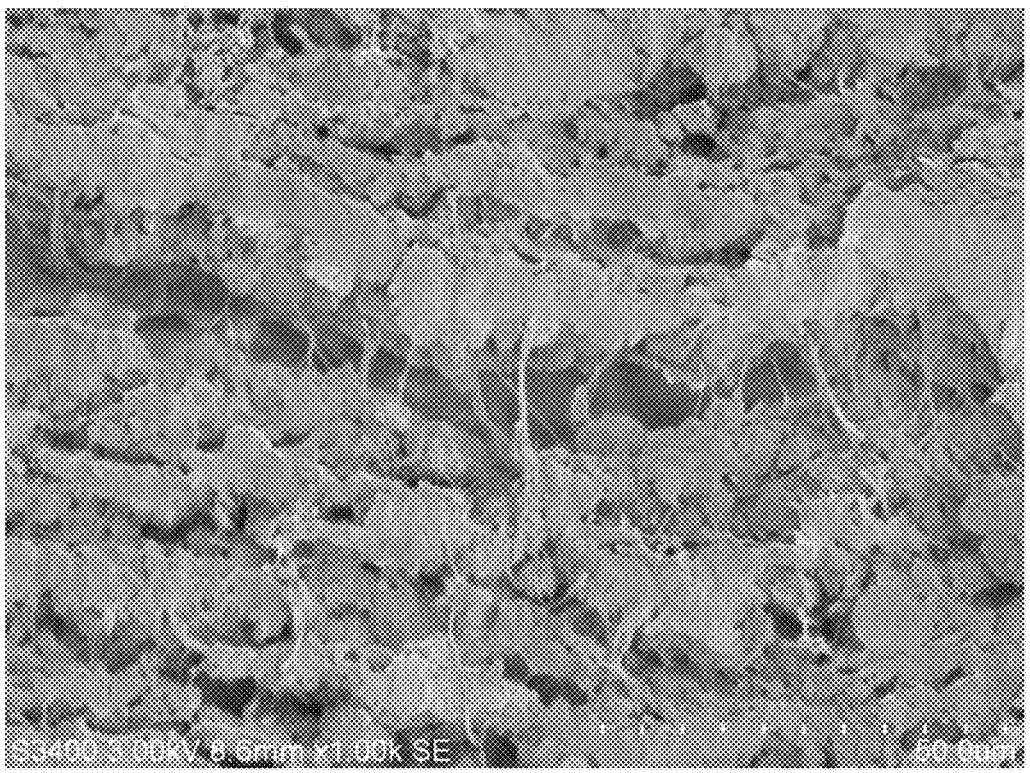

FIGS. 1 & 2 are SEM photos, at 500× and 1000× magnification, respectively, of the surface of a paper made from the combination of aerogel powder and aramid polymer fibrils. FIGS. 3 & 4 are cross-sectional views, at 500× and 1000× magnification, respectively, of a calendered or densified paper made from the combination of aerogel powder and aramid polymer fibrils.

The paper has a thickness of 100 to 4000 micrometers (0.1 to 4 millimeters). The minimum gap between the cells (either pouch or prismatic type cell) is almost 0.1 mm to allow criteria of current battery design, and also, battery cell and module designers make battery pack design as compact as possible because of the limited space in electrical vehicles, Therefore, more than a 4 mm gap between two cells is generally not desirable. In some embodiments, the paper has a thickness of 300 to 3000 micrometers (0.3 to 3 millimeters). In some embodiments, the paper can have a basis weight of from 50 to 500 grams per square meter. In some embodiments, the paper has a basis weight of from 100 to 300 grams per square meter.

By aerogel, it is meant a synthetic porous ultralight material derived from a gel, in which the liquid component for the gel has been replaced with a gas. The result is a solid with extremely low density and low thermal conductivity.

Aerogels can be made from a variety of chemical compounds, but silica aerogel is the preferred and the most common type of aerogel.

As used herein, all of the terms "aerogel", "aerogel powder, and aerogel particles" are used interchangeably to mean preferred aerogels that are highly porous, hydrophobic, high surface area, preferably amorphous silica particles or granules having a particle size range of from 10 nanometers to 50 micrometers (0.00001 to 0.05 millimeters), and preferably a particle size range of from 0.05 to 20 micrometers. In general, they are chemically similar to common fumed silica products but have larger aggregate sizes, higher surface areas and larger pore volumes, including higher porosity (>95%), lower density (0.03~0.1 g/cm$^3$), small average pore diameter (20 nm), lower thermal conductivity (0.017~0.022 W/mK), higher surface area (600~800 m$^2$/g) and are generally produced in a sol gel manufacturing process. Pioneering patents describing aerogels include U.S. Pat. Nos. 2,093,454; 2,188,007; and U.S. Pat. No. 2,249,767 to Kistler, and more recent disclosures are available, such as U.S. Pat. Nos. 8,518,335 & 8,961,919 to Joung et al.

Figure 8:
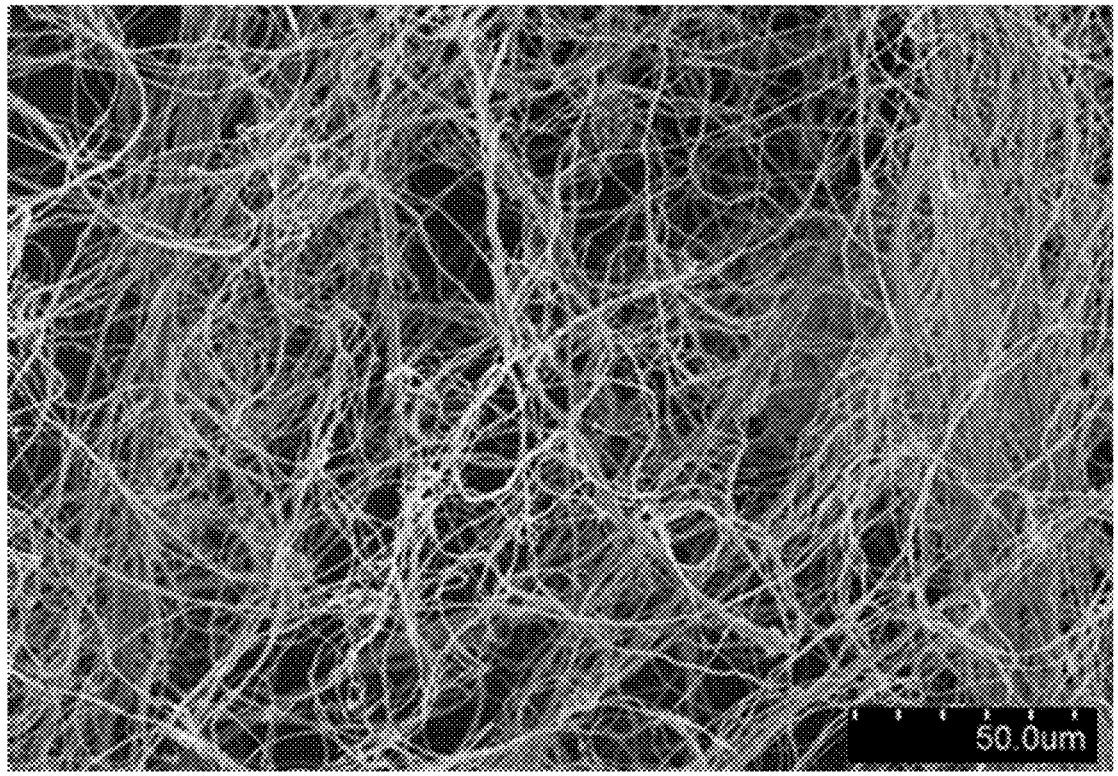
FIG. 8 is a digital photo, taken at 1000× magnification, of aramid polymer fibrils.

The term "aramid polymer fibrils", as used herein, are hair-dike fibrous material having a diameter of 10 to 2000 nanometers, preferably 10 to 1200 nanometers, that is made from an aramid polymer, or polymer blend containing at least two polymers wherein a majority amount (greater than 50 weight percent) of aramid polymer is present. FIG. 8 is representative digital photo of aramid polymer fibrils, Aramid polymer fibrils further have a preferred length of 0.2 to 3 millimeters. The "length" of the fibrous material referred to herein, such as the aramid polymer fibrils and pulps, is meant to be the measured "length-weighted average" length. In some preferred embodiments, the aramid polymer fibrils are refined aramid polymer fibrils made from floc by exposing the floc to a refining step that shears the floc into the smaller aramid polymer fibrils. In some preferred embodiments, the aramid polymer fibrils have a length that is 0.4 to 3 millimeters (mm), preferably 0.8 to 3 mm.

It is believed the diameter of the aramid polymer fibrils has an impact on the distribution and sizes of pores in the paper structure as it is formed, specifically providing a structure designed to capture or entrap the aerogel powder. Aramid polymer fibrils having a diameter of greater than 2000 nanometers create undesirably high pore sizes in the paper, which can ultimately result in large pores in the paper as it is formed that allow nano- and micro-sized aerogel powder to be easily washed out during paper making process. Also, it is believed that aramid polymer fibrils having a diameter of less than 10 nanometers or a length of less than about 0.2 millimeters do not contribute to mechanical strength of paper due to lower aramid polymer fibrils entanglement therefore it is desirable that a majority of the aramid polymer fibrils have a length of 0.2 millimeters or greater.

The aramid polymer fibrils further have an aspect ratio that can range from about 150 to 300,000. The aspect ratio is also known as the length divided by the diameter, and the phrases "aspect ratio", "average length-to-diameter ratio", and "length-to-diameter" are used interchangeably herein. In some embodiments, the average length-to-diameter ratio of the aramid polymer fibrils is about 1000 or greater. In some embodiments, the aramid polymer fibrils have an average length-to-diameter ratio of about 3000 or less. In some preferred embodiments, the average length-to-diameter ratio ranges from about 1000 to 3000. It is believed that the higher average length-to-diameter ratio of the aramid polymer fibrils contribute to better mechanical reinforcement of the paper.

Because the qualitative measurements of certain fibrous materials like aramid polymer fibrils can be difficult, such fibrous materials can be compared by measuring the "freeness" of the fiber material. The most popular techniques that measure freeness measure either the Canadian Standard Freeness (CSF) or the Schopper-Riegler Freeness (SRF).

The inventors believe the Canadian Standard Freeness (CSF) is the preferred technique for characterizing the aramid polymer fibrils used herein. The aramid polymer fibrils are preferably made by refining aramid polymer fibers or floc to make the fibrils; such fibrils preferably have a CSF of 0 to 50 milliliters, and in some embodiments, have a CSF of 0 to 20 milliliters. CSF is one indication of the fineness of the aramid polymer fibrils, or the degree they are fibrillated during refining, with very fine aramid polymer fibrils having a very low CSF. Low CSF values also are indicative of uniformly sized aramid polymer fibrils, as materials having a wide distribution of sizes generally have high CSF values.

The aramid polymer fibrils defined herein are fibrous material and are distinct from the aramid polymer pulps of the prior art. Such aramid polymer pulps are preferably made by refining floc or can be made directly from ingredients as was taught in U.S. Pat. Nos. 5,202,184; 5,523,034; and 5,532,034. However, not only do such processes provide fibrous material having a wider range of fiber sizes and lengths, due to the difficulty of controlling such processes, the processes and can provide both "stalks" and fibrils extending from the stalks, with the stalk being a generally columnar remnant of the original aramid polymer floc and being about 10 to 50 microns in diameter. Further, in the case of aramid polymer pulp, the length measurement is understood to be the length of the stalk feature of the pulp, which is also referred to as the "pulpstalk".

Also, the average length-to-diameter ratio of the aramid polymer fibrils is far greater than the average length-to-diameter ratio for conventional aramid polymer pulp, such as made by the processes in U.S. Pat. Nos. 5,084,136; 5,171,402; and 8,211,272, which is believed to have an average length-to-diameter ratio generally less than 150; or the average length-to-diameter ratio of highly refined pulp such as disclosed in US patent publications 2016/0362525 and 2017/0204258 which is believed to have an average length-to-diameter ratio less than that of conventional pulp (e.g., generally less than 100).

Further, the aramid polymer fibrils, as used in the paper, have essentially no stalks present or are stalk-free aramid polymer fibrils. As used herein, the term "stalk-free aramid polymer fibrils" means that at least 95% by weight of the fibrous material are aramid polymer fibrils having the desired diameter of 10 to 2000 nanometers by optical measurement of a fibril sample using 500× or 1000× magnification. In some embodiments, at least 98% by weight of the fibrous material are aramid polymer fibrils having the desired diameter of 10 to 2000 nanometers by optical measurement of a fibril sample using 500× or 1000× magnification. In some embodiments, 100% by weight of the fibrous material are aramid polymer fibrils having the desired diameter of 10 to 2000 nanometers by optical measurement of a fibril sample using 500× or 1000× magnification.

Figure 9:
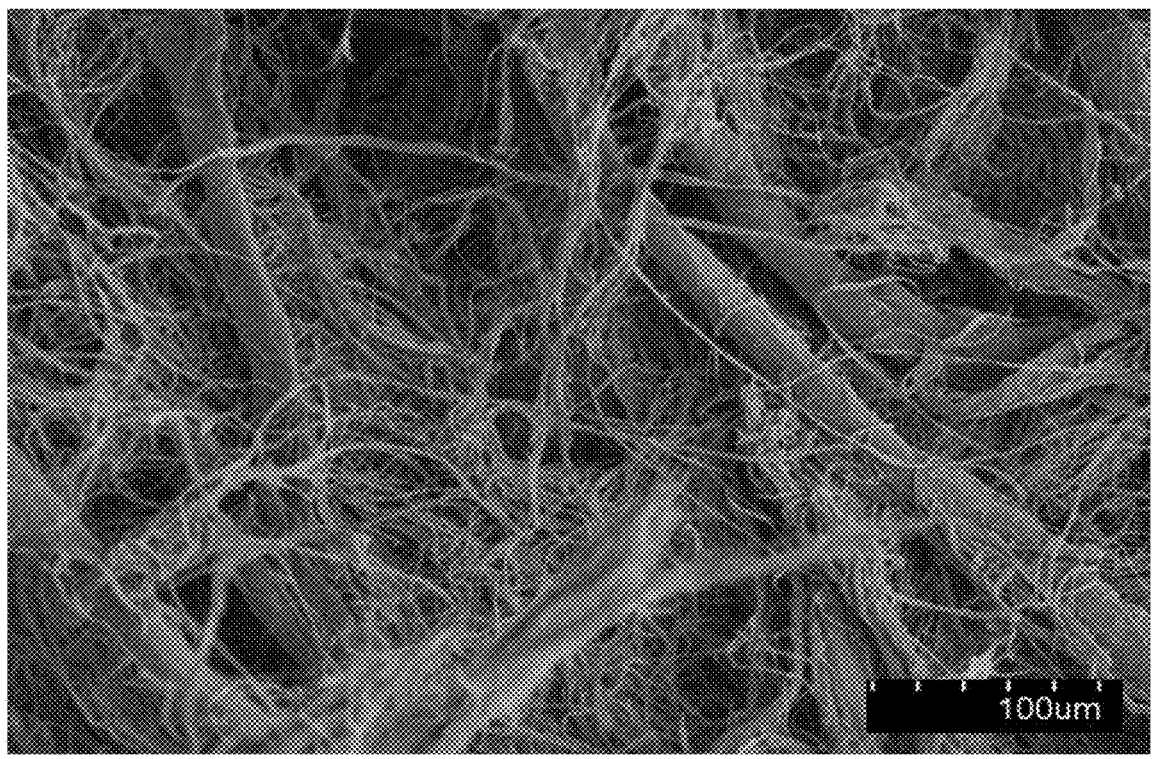
FIG. 9 is a digital photo, taken at 500× magnification, of a commercially available aramid pulp.

One preferred method of generating stalk-free aramid polymer fibrils is to refine a fiber or floc made from a polymer blend containing at least two polymers wherein a majority amount (greater than 50 weight percent) of aramid polymer is present, One preferred polymer blend is a polymer blend of 80 to 96 weight percent polyparaphenylene terephthalamide (PPD-T) and 4 to 20 weight percent of polyvinylpyrrolidone (PVP). When aramid fiber or aramid floc made from this PPD-T/PVP polymer blend is refined, the resulting fibrous material is essentially all fibrils and there are essentially no larger stalks present in the material, as shown in the digital photo of FIG. 8. It is believed that at least 4 weight percent PVP must be present in the original fiber or floc in order for the fiber or floc to be refined into fibrils with essentially no stalks remaining. This is compared to traditional refined aramid pulp made from polyparaphenylene terephthalamide (PPD-T) homopolymer as shown in FIG. 9, having visible stalks.

It has been found that the porosity and the crystal nature of filaments made from the blend of 80 to 96 weight percent PPD-T and 4 to 20 weight percent of PVP are dramatically different from filaments consisting solely of PPD-T. Herein, the term "fiber" is used interchangeably with the term "filament". Fiber spun directly from a polymer solution onto a bobbin without cutting is commonly referred to as continuous fiber or continuous filament, and multifilament yarns comprise a plurality of continuous filaments.

Figure 10:
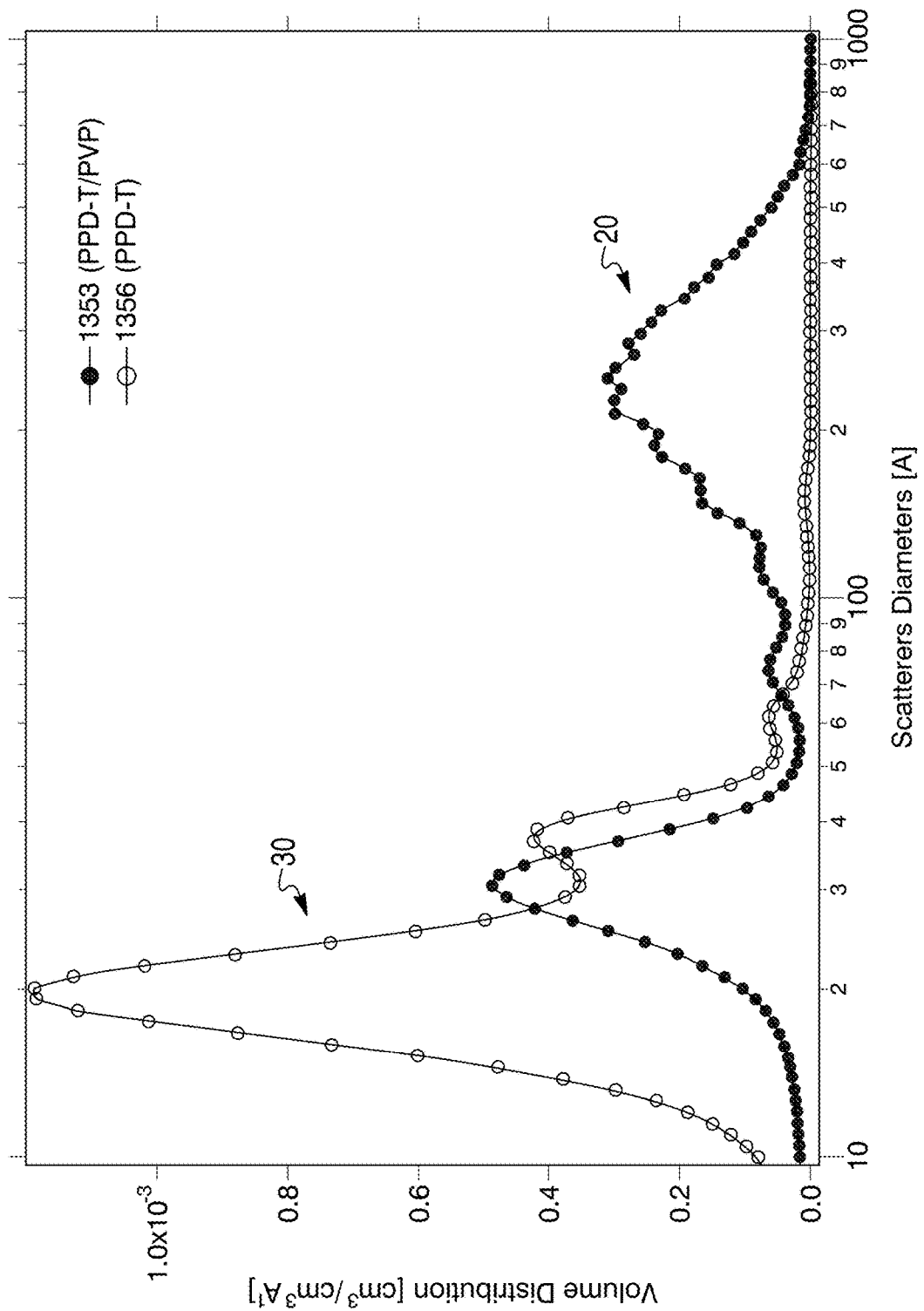
FIG. 10 is a graphical representation comparing the distribution of pores in PPD-T/PVP filaments versus PPD-T filaments.

FIG. 10 illustrates the difference in the x-ray scattering of the two types of filaments. Curve 20 is representative of the PPD-T/PVP blend filaments, while curve 30 is representative of the filaments made solely with PPD-T, Curve 30 illustrates the PPD-T filaments have a significant peak centered at about 2 angstroms (and a much lesser peak centered around 4 angstroms) indicating very small pores in the fiber. Curve 20 illustrates the PPD-T/PVP blend has a much broader distribution of pore size, with a peak centered at about 3 angstroms and a very broad sloping peak centered at about 250 angstroms but extending over an area ranging from about 70 to 600 angstroms. It is believed this indicates the filaments made from the PPD-T/PVP blend have a very large number of much larger pores than the PPD-T filaments.

Further, it is believed that because of this difference in the fiber crystallinity and pore structure, when the filaments are mechanically refined, the result is a much finer and more uniform distribution of fibrils, as illustrated in FIG. 8. In other words, it is believed the very high crystallinity and low porosity of the PPD-T fiber means that when it is mechanically refined, the refining shearing action primarily abrades the surface of the filaments creating the typical stalks-with-fibrils structure (as shown in FIG. 9); while the lower crystallinity and high porosity of the PPD-T/PVP blend filaments makes them more conducive to easy separation into individual refined fibrils under the same shearing action; with a larger number of smaller and relatively more uniform diameter fibrils, and more importantly essentially without any stalks (i.e., stalk-free). It is believed the aramid polymer fibrils have a relatively uniform diameter having a total diameter size range of about 300 nanometers as measured visually from SEM photomicrographs.

The aramid polymer fibrils are preferably made from aramid floc having as the majority polymeric material component by weight PPD-T, and at least one other polymeric material component; these components are preferably mutually immiscible so that the at least two polymeric materials will be present in the floc in closely-mixed but separate solid phases. Such aramid flocs, when refined, yield aramid polymer fibrils with domains of two distinct polymeric materials; one phase being the continuous or primary polymer phase, or the PPD-T polymer, and the other phase being the discontinuous or secondary polymer phase, which is in the preferred instance PVP polymer.

It is believed the discontinuous or secondary polymer phase is present as small, nanometer-sized crystal domains of material running through the floc and serving, in the refining process, as points of disruption in the floc structure to promote ready and more complete refining of the floc into fibrils. After the refining, a portion of the discontinuous or secondary polymer from each disruption point is present on or at the surface of each fibril that results from the refining process.

The aramid polymer fibrils also have high surface area. The words "surface area", "specific surface area", and "BET surface area" are used interchangeably herein. The aramid polymer fibrils have a specific surface area of from about 3 to 40 $m^2/g$. In some embodiments, the specific surface area is 6 $m^2/g$ or greater; in some embodiments, the specific surface area is 8 $m^2/g$ or greater, One particularly preferred range of specific surface area is from 6 to 20 $m^2/g$.

Comparatively, traditional pulp refined from floc made from a single polymeric material, or from a miscible blend of polymeric materials that does not have the domains of discontinuous secondary polymer, will not have such a high surface area. Further, if this floc is refined enough to have such a measured high surface area, the resulting pulp particles have such a low aspect ratio (resulting from very low average length) they will not provide adequate reinforcement of the paper.

The preferred aramid fibrils comprise 80 to 96 weight percent poly (paraphenylene terephthalamide) (also known and used herein as polyparaphenylene terephthalamide or PPD-T). By PPD-T is meant the homopolymer resulting from mole-for-mole polymerization of p-phenylene diamine and terephthaloyl dichloride and, also, copolymers resulting from incorporation of small amounts of other diamines with the p-phenylene diamine and of small amounts of other diacid chlorides with the terephthaloyl dichloride. As a general rule, other diamines and other diacid chlorides can be used in amounts up to as much as about 10 mole percent of the p-phenylene diamine or the terephthaloyl dichloride, or perhaps slightly higher, provided only that the other diamines and diacid chlorides have no reactive groups which interfere with the polymerization reaction. PPD-T also means copolymers resulting from incorporation of other aromatic diamines and other aromatic diacid chlorides such as, for example, 2,6-naphthaloyl chloride or chloro- or dichloro-terephthaloyl chloride; provided, only that the other aromatic diamines and aromatic diacid chlorides be present in amounts which permit preparation of anisotropic spin dopes. Preparation of PPD-T is described in U.S. Pat. Nos. 3,869,429, 4,308,374; and 4,698,414.

The preferred aramid fibrils also comprise 4 to 20 weight percent of poly (vinyl pyrrolidone) (also known and used herein as polyvinylpyrrolidone or PVP. By PVP is meant the polymer which results from linear polymerization of monomer units of N-vinyl-2-pyrrolidone and includes small amounts of co-monomers that may be present in concentrations below those that do not interfere with the interaction of the PVP with the PPD-T. PVP of molecular weights ranging from as little as about 5000 to as much as about 1,000,000 can be used. PVP of very high molecular weight yields spinning dopes of high viscosity. PVP with a molecular weight of about 10,000 to about 360,000 is preferred.

Aramid polymer fibrils are preferably made by solution spinning a continuous filament yarn from a dope containing an aramid polymer, cutting the continuous filament yarn into floc, and then mechanically refining that floc into fibrils using one or more refiners. In a preferred process the dope is a solution containing a combination of PPD-T polymer and PVP polymer in sulfuric acid. Example representative processes for making continuous filament yarn are found in U.S. Pat. Nos. 5,073,440 and 5,094,913 and US Pat. Pub. US2006/0113700. Aramid floc is then cut from the continuous filament yarn. Prior to refining, the aramid floc generally has a length of from about 2 millimeters to about 25.4 millimeters, in some instances 2 to 10 millimeters, or even 3 to 10 millimeters.

Aramid polymer fibrils are preferably produced from floc by refining or fibrillating the preferred PPD-T/PVP floc using techniques that cut, masticate, or abrade the PPD-T/PVP floc using mechanical methods familiar to papers, e.g., dry and wet disc or cone refining, hydrapulping, and beating. Preferably the refining is conducted on a dispersion of the floc in water, and preferably the dispersion is refined multiple passes through the refiner. That is, the refined dispersion leaving the refiner is recycled back through the same or a second refiner for a second pass through the refiner, and so on. The starting dispersion generally has a solids content of about 1 to 4 weight percent of the floc in water.

If the floc is a PPD-T/PVP floc, the floc can be fully fibrillated to stalk-free aramid polymer fibrils after just three passes through the refiner and is then suitable for making papers. The stalk-free aramid polymer fibrils have a very low Canadian Standard Freeness (CSF) compared to pulp made from fibers that have tendency to fibrillate into a mixture containing a large quality of stalks combined with fibrils. While suitable fibrils result from three passes through the refiner, additional passes through the refiner may be made, with as many as 20 or more passes thought useful to further distribute and uniformize the fibrils, as long as the final strength of the paper is not negatively affected. Preferably the fibrils are made by recycling the dispersion through the refiner for 3 to 20 passes; in some embodiments 3 to 10 passes through the refiner are used.

It is believed that with adequate care, stalk-free aramid polymer fibrils could be obtained from more traditional PPD-T, acrylic, or cellulosic pulp if a subsequent process after the refining step was used to separate or recover the fibrils from the stalks. It is contemplated that if such fibrils met the definition of "stalk-free" as put forth herein they would be suitable fibrils for use in the paper.

If desired, the paper can further comprise mica, in an amount of 10 weight percent or more, based on the total weight of the aerogel powder, aramid polymer fibrils, and mica in the paper. It is believed that in the paper structure, the addition of mica further enhances the flame barrier and dimensional stability of the paper. The planar or flake shape of mica provides an anisotropic flame barrier (in the z-direction perpendicular to the plane of the flake) and also the thermal conductivity in z-direction is hundred times lower than that of x-y direction. The planar mica preferentially aligns with and in the planar structure of the paper, so the z-direction properties of the mica provide improved thermal insulation through plane of the paper. In some instances at least 20 weight percent mica is desired in the paper to provide superior dimensional stability and flame barrier.

Figure 5:
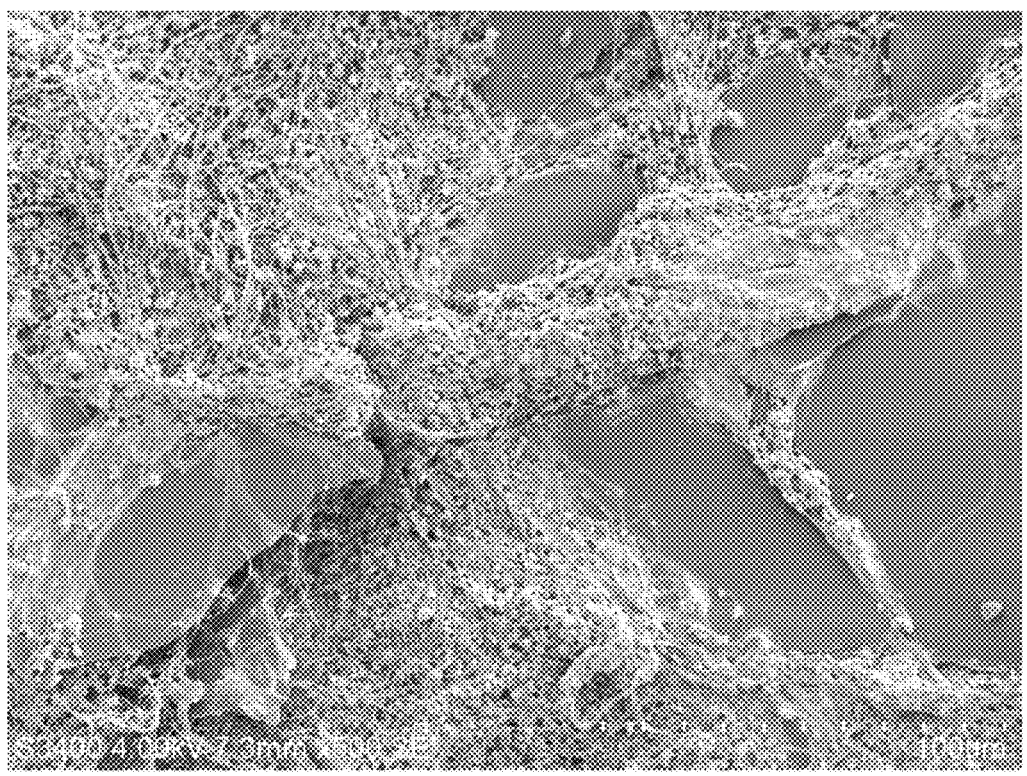
FIGS. 5 & 6 are SEM photos, at 500× and 1000× magnification, respectively, of the surface of a paper made from the combination of aerogel powder, aramid polymer fibrils, and mica.
Figure 6:
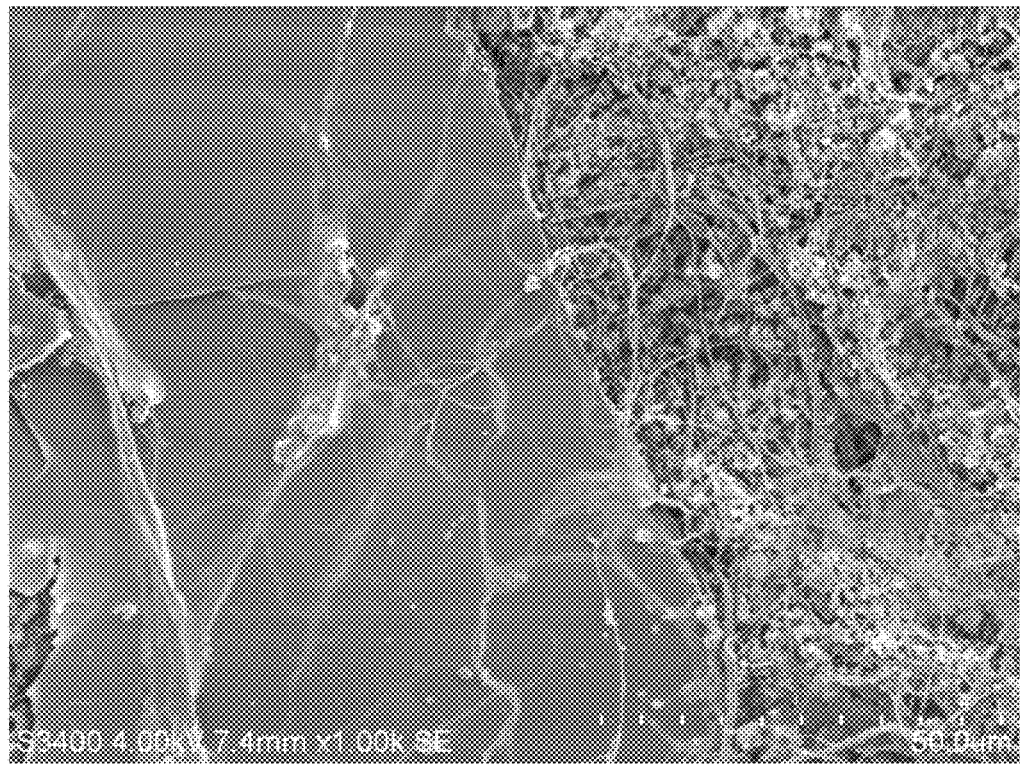

FIGS. 5 & 6 are SEM photos, at 500× and 1000× magnification, respectively, of the surface of a paper made from the combination of aerogel powder, aramid polymer fibrils, and mica.

The mica includes muscovite or phlogopite mica, or blends thereof, and may be calcined or uncalcined mica. "Calcined mica" as used herein means mica that is obtained by heating natural mica to a high temperature (usually greater than 800° C., sometimes more than 950° C.). This treatment removes water and impurities and improves the temperature resistance of the mica. Calcined mica is normally used in the form of a flake particle and mica of the muscovite type is preferred. "Uncalcined mica" as used herein means mica that is essentially in pure natural form that has preferably been homogenized and purified to remove imperfections and impurities. Uncalcined mica can form a very porous mica layer due to the larger size of the natural mica flakes. The preferred mica is calcined mica, due to its improved dielectric properties and corona resistance over uncalcined mica.

The term aramid, as used herein, means aromatic polyimide, wherein at least 85% of the amide (—CONH—) linkages are attached directly to two aromatic rings. Optionally, additives can be used with the aramid and may be dispersed throughout the polymer structure. It has been found that up to as much as about 10 percent by weight of other supporting material can be blended with the aramid. It has also been found that copolymers can be used having as much as about 10 percent of other diamines substituted for the diamine of the aramid or as much as about 10 percent of other diacid chlorides substituted for the diacid chloride of the aramid. The aramid can preferably be a para-aramid or an aramid copolymer. The aramid polymer is considered a para-aramid when the two rings or radicals are para oriented with respect to each other along the molecular chain. Methods for making para-aramid fibers are generally disclosed in, for example, U.S. Pat. Nos. 3,869,430; 3,869,429; and 3,767,756. One preferred para-aramid is poly (paraphenylene terephthalamide); and one preferred para-aramid copolymer is co-poly (p-phenylene/3,4'diphenyl ester terephthalamide). U.S. Pat. Nos. 3,063,966; 3,227,793; 3,287, 324; 3,414,545; and 5,667,743 are illustrative of other methods for making aramid fibers.

Specifically, a desirable commercially-suitable process for making the inventive papers include the use of a papermaking machine, by providing an aqueous dispersion containing the aerogel powder and aramid polymer fibrils and any optional material, in the desired amount and proportion, to the headbox of the paper-making machine and then uniformly wet-laying and dispersing these solids as a web onto a papermaking wire and removing the majority of the liquid water. The wet web can then be dried on dryer drums to form a paper. In some embodiments, the paper can be further preferably calendered or pressed in the nip of a hot roll calender under pressure and heat, or by other means, to consolidate and densify the paper into a layer having the desired thickness and properties. If desired, two or more lighter basis weight or thinner wet webs of the same composition can be made separately and then calendered and consolidated together into a single layer.

Representative devices and machinery that can be used to make paper include continuous processing equipment such as, for example without limitation to, a Fourdrinier or inclined wire machine, or batch processing equipment such as those that make paper by hand in a hand-sheet mold containing a forming screen. Reference may be made to U.S. Pat. No. 3,756,908 to Gross and U.S. Pat. No. 5,026,456 to Hesler et al. for general processes of forming aramid materials into papers.

In some embodiments, the paper has a tensile strength of 0.5 to 100 megapascals (MPa). In some applications, it is desirable for the paper to have a tensile strength of at least 15 megapascals or greater. For example, it is believed the paper needs this level of tensile strength to survive some battery fabrication processes, which can include the automatic insertion of flame barriers and thermal insulation materials between the cells. The tensile strength also contributes to the flame barrier in use. Paper tensile strengths above 100 megapascals do not have negative effects, but the parameter reaches a point of diminishing value. Therefore, in some preferred embodiments, the paper has a tensile strength of from 15 to 50 megapascals. In some embodiments, the paper has a tensile strength of from 15 to 100 megapascals.

In some embodiments, the paper has a thermal conductivity of 0.015 to 0.05 watt per meter Kelvin (W/mK). To prevent thermal propagation effectively, papers having a lower thermal conductivity that is stable over a wide range of operating temperature including battery operating temperature (−40° C. to 80° C.) and up to thermal hot spot temperature (800° C.~1,000° C.) is preferred. In some embodiments, the paper has a thermal conductivity of from 0.015 to 0.04 W/mK.

In some embodiments, a 1 mm (+/−30%) thick paper comprising the aerogel powder and aramid polymer fibrils exhibits a TPP flame performance of at least 10 seconds to an equivalent 2nd degree burn, as measured by the Thermal Performance Protection Test (TPP); and some embodiments, that paper exhibits a TPP flame performance of at least 12 seconds to an equivalent 2nd degree burn.

It is believed there is a synergistic effect on paper thermal and mechanical properties resulting from the combination of aerogel powder and aramid polymer fibrils. The inventive paper shows steadily increasing in dielectric strength with increasing mica content, but also shows steadily decreasing mechanical strength and toughness (tensile strength and elongation). However, increasing amounts of aerogel powder improves the thermal insulation (lowering the thermal conductivity) as well as better flame protection (TPP). In some instances, the inventive papers, containing the combination of aerogel powder and aramid polymer fibrils, have almost a third less of the thermal conductivity (i.e. more insulating) while providing almost 75% more thermal protection (TPP) when compared to papers made by simply mixing the mica, aerogel, and fibrids together and making paper. These outstanding properties as well as the significant improvement in shedding issues indicate these papers are suitable for use as battery thermal insulation and flame barriers (cell-to-cell, cell-to-module, inside module and pack, and the like).

Multi-cell battery structures have battery cells positioned either in parallel or in series and are commonly known as battery blocks and battery packs. In these multi-cell battery structures, the heat energy from unusual thermal issues, such as faults or failures, in one cell can propagate to adjacent cells. If the thermal issues are severe enough they can propagate from cell-to-cell and cause a runaway thermal condition that can cascade to all the cells in the battery block or pack, resulting in a fire or even worse.

To protect neighboring battery cells from overheated cells, better flame barriers and fire-retardant insulation have low thermal conductivity as well as high dimensional stability at higher temperatures. When a thermal event occurs, the overheated cell temperature can go up as high as 800° C. and even higher; however, neighbor cells should be maintained at 200° C. or lower. Therefore, thermal insulation between neighboring cells is preferably adequately thermally stable up to at least 800° C.

A battery comprising the paper(s) described herein can be made by using the paper(s) as cell-to-cell insulation. By "cell-to-cell insulation" it is meant to include materials that are inserted between individual battery cells in a multi-cell battery structure that provide thermal insulation; that is, they attempt to thermally isolate each battery cell and also retard the transfer of heat energy should the battery cell develop a thermal "hot spot" or have an unusual thermal issue such as a thermal runaway, which could result in an explosion.

In one application, the paper is inserted between individual battery cells in a multi-cell battery structure to provide a flame barrier and thermal insulation between individual battery cells. Representative battery types include, but are not limited to, multi-cell battery structures having battery cells positioned either in parallel or in series that are commonly known as battery blocks and battery packs. However, other batteries comprising the described paper(s) are possible, as long at the paper(s) are intended to thermally isolate each battery cell and retard the transfer of heat energy and/or flame from one cell to another cell or structure.

Test Methods

The following test methods were used in the Examples provided below.

Thickness was measured according to TAPPI 411 using 5 N/cm² weight and reported in mm.

Basis Weight was measured according to ASTM D 645 and ASTM D 645-M-96 and reported in g/m².

Tensile Strength was measured according to ASTM D 828-93 with 2.54 cm wide test specimens and a gage length of 18 cm and reported in N/cm or MPa.

Dielectric Strength was measured according to ASTM D149-97A and reported in kV/cm.

Thermal Conductivity was measured according to ASTM E 1530 and reported in W/mK.

Thermal Performance Protection Test (TPP) is a measure of the flammability performance of fabrics and sheets of material, providing realistic conditions of an exposure to combined radiant and convective heat. A sample is subjected to circumstances typical for fires: a constant combination of 50% radiant heat and 50% convective heat, at a constant heat flux of 84 kW/m² (2 cal/cm²/sec). The test then measures the time that elapses and the amount of heat energy per surface area (TPP value) at which the temperature and energy transferred to the back of the fabric reaches a level that is equivalent to a second-degree burn, if the material was being worn. The TPP test method used is the test method that has been adopted by ISO as a test method standard (ISO 17492) with a heat flux exposure of 80 kW/m²; however, the US NFPA 1971 standard requires the ISO 17492 test to be carried out at a modified, increased heat flux exposure of 84 kW/m², and this higher heat flux was used herein.

Example 1

Four different papers, designated 1-1 to 1-4, were made from aramid polymer fibrils and aerogel powder. The aramid polymer fibrils had a Canadian Standard Freeness of 0 ml and a specific surface area after drying of 13.8 m²/g. The aramid polymer fibrils were composed of 87 weight percent of PPD-T polymer and 13 weight percent of PVP polymer and had an average length-to-diameter ratio of about 2000. The aerogel powder was Type IC 3100 Enova® Aerogel, obtained from Cabot Corp, of Boston, Mass. Four well-mixed aqueous dispersions having differing amounts of aramid polymer fibrils and aerogel powder, but all having about the same 0.18% solids content were prepared having the composition as shown in Table 1.

Each of the four aqueous dispersions was then poured, with about 8 liters of water to create a furnish with about 0.05% total solid content, into a 21×21 cm hand-sheet mold to form a wet-laid hand-sheet. Each hand-sheet was then removed and placed between two pieces of blotting paper, hand couched with a rolling pin and dried in a hand-sheet dryer at 150° C. for 10 minutes. The papers were then dried, and the dried papers exhibited a smooth, non-shedding surface. As shown in FIG. 1, the aerogel powder particles were captured in the network of nano fibrils around the particles. Properties of the resulting paper structures are listed in the Table 1.

Comparative Example A

Comparative Paper A was prepared by first forming an aqueous dispersion of 8 grams of aerogel powder and 2 grams of MPD-I fibrids in water; the fibrids did not contain any aerogel polymer. The MPD-I fibrids were made in a manner generally described in U.S. Pat. No. 3,756,908.

The term fibrids, as used herein, means very small, non-granular, fibrous or film-like particles with at least one of their three dimensions being of minor magnitude relative to the largest dimension. These particles are prepared by precipitation of a solution of supporting material using a non-solvent under high shear. Aramid fibrids are non-granular film-like particles of aromatic polyamide having a melting point or decomposition point above 320° C. The preferred aramid fibrid is a meta-aramid fibrid, and especially preferred are fibrids made from the meta-aramid poly (metaphenylene isophthalamide) (MPD-I).

Fibrids generally have a largest dimension length in the range of about 0.1 mm to about 1 mm with a length-to-width aspect ratio of about 5:1 to about 10:1. The thickness dimension is on the order of a fraction of a micron, for example, about 0.1 microns to about 1.0 micron. Never-dried fibrids were used in the dispersion.

The aqueous dispersion was then used to form hand-sheets as described in Example 1. The dried papers exhibited a grainy, shedding surface. The physical and thermal properties are shown in Tables 1 & 2.

TGA (thermal gravimetric analysis) of the dried paper showed that the residue of aerogel particles weighed about 5.15 gram left, meaning roughly 51.2% original aerogel powder was lost during the paper making process. The data in Table 2 illustrates the synergistic effect on paper thermal and mechanical properties resulting from the combination of mica and aerogel-containing fibrids. The paper shows steadily increasing in dielectric strength with increasing mica content, but also shows steadily decreasing mechanical strength and toughness (tensile strength and elongation). However, increasing amounts of aerogel powder in the paper improved the thermal insulation (lowering the thermal conductivity) as well as better flame protection (TPP). Both the Comparative Example A and Example 2-3 papers were made with 20 weight percent aerogel powder; however, the Example 2-3 paper has almost half the thermal conductivity (i.e. twice the insulative property) and twice the thermal protection (TPP) as the Comparative Example A paper. These outstanding properties as well as significant improvement in shedding issues indicate these papers are suitable for use as battery thermal insulation and flame barriers (cell-to-cell, cell-to-module, inside module and pack, and the like).

Comparative Example B

Comparative Paper B was prepared from an aqueous dispersion containing only fibrids; however, these fibrids were modified fibrids made from a polymer dispersion containing aerogel powder. In other words, the actual fibrids contained a blend of polymer and aerogel powder.

Specifically, the polymer dispersion was made by combining 65 parts by weight of the solvent dimethylacetamide, 15 parts by weight of poly (metaphenylene isophthalamide) (MPD-I) polymer, 5 parts by weight calcium chloride (as a solubility enhancer), and 15 parts by weight of aerogel powder (Type IC 3100 Enova® Aerogel, obtained from Cabot Corp. of Boston, Mass.) in a kettle while stirring until a uniform mixture was obtained. The mixture was then poured slowly into a vigorously-stirring waring blender, which simultaneously coagulated the polymer from the solvent into filmy fibrids, where the MPD-1 polymer and aerogel powder was present in a 1:4 ratio. The resulting modified fibrids were collected on a Buchner funnel as a wet-laid paper and thoroughly washed with de-ionized water. Using the procedure of Example 1, an aqueous dispersion and hand-sheet was made using these modified fibrids. The composition and test results are shown in Tables 1 & 2.

To analyze the different amount of silicate, and therefore the amount of aerogel anchored in all samples, TGA thermal gravity analysis (TGA) was done on all of the 1-1 to 1-4 and Comparative A & B papers using a TA instruments Q500 TGA (40-700C) with high resolution in the air. The results are shown in the Tables 1 & Table 2. As might be expected, the paper samples made by simply mixing fibrids and aerogel powder together showed the highest loss of aerogel in the final structure, retaining just 64% of the added aerogel powder. The paper samples made by encapsulating the aerogels in the fibrids performed better, retaining 71% of the aerogel powder. However, surprisingly, the paper samples made by mixing aramid polymer fibrils and aerogel powder increased the aerogel powder retention to greater than 90%, the range being 92 to 95% for the four paper samples. This fully illustrated the aerogel powder particles were captured in the network of aramid polymer fibrils.

Figure 7:
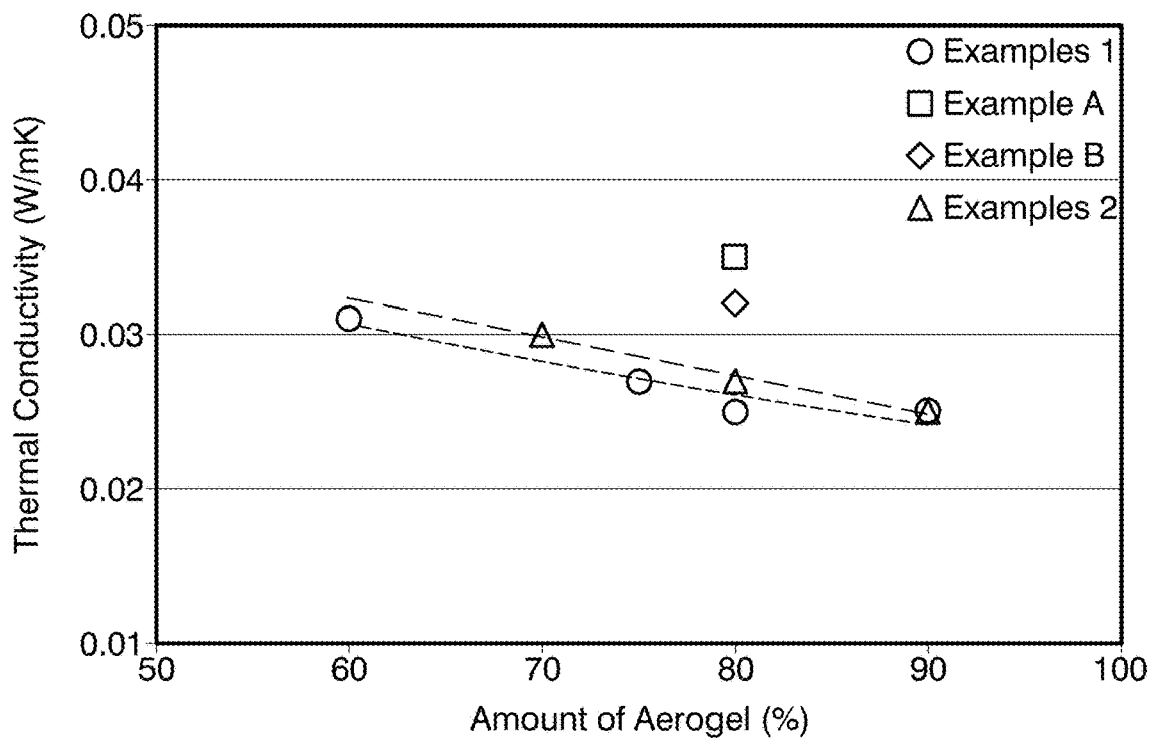
FIG. 7 is a plot of thermal conductivity of several papers made from the combination of aerogel powder and aramid polymer fibrils, showing the affect differing amounts of total aerogel powder with aramid polymer fibrils have on paper thermal conductivity.

The thermal conductivity was then measured on these paper samples using thin film method with transient plane source (TPS 1500) with a pressure of 2.45 kg on diameter stacked samples. The practical effect of the retained aerogel particles on the thermal conductivity of the paper samples is shown graphically in FIG. 7. The paper samples made by mixing aramid polymer fibrils and aerogel powder samples had the lowest thermal conductivity; and when the thermal conductivity of all the samples made at the 80 weight percent added aerogel level were compared, Example 1-3 was found to have 29% and 22% percent lower thermal conductivity than Comparative Example A & B, respectively.

TABLE 1

| | Composition (wt. %) | | | Actual Amount of Aerogel Residue (wt. %) | Percent Aerogel Retained (%) |
|---|---|---|---|---|---|
| | Aramid Fibrils | Fibrids | | | |
| Example | Polymer | MPD-I | Aerogel | Aerogel | | |
| 1-1 | 40 | — | — | 60 | 55.8 | 93 |
| 1-2 | 25 | — | — | 75 | 68.9 | 92 |
| 1-3 | 20 | — | — | 80 | 74.6 | 93 |
| 1-4 | 10 | — | — | 90 | 85.4 | 95 |
| A | — | 20 | — | 80 | 51.2 | 64 |
| B | — | 20 | 80 | — | 61.7 | 77 |

TABLE 2

Examples and Comparative Examples

| Properties | 1-1 | 1-2 | 1-3 | 1-4 | A | B |
|---|---|---|---|---|---|---|
| Thickness (mm) | 0.70 | 0.69 | 0.79 | 0.78 | 0.73 | 0.82 |
| Basis Weight (g/m$^2$) | 200 | 215 | 224 | 215 | 218 | 220 |
| Tensile Strength (MPa) | 6.2 | 5.4 | 4.6 | 2.1 | 7.4 | 10.2 |
| Elongation (%) | 5.4 | 3.3 | 2.1 | 2.3 | 4.6 | 8.7 |
| Dielectric Strength (kV/cm) | 260 | 184 | 167 | 132 | 230 | 170 |
| Thermal Conductivity (W/m-K) | 0.031 | 0.027 | 0.025 | 0.025 | 0.035 | 0.032 |
| TPP 2$^{nd}$ degree burn (seconds) | 6.6 | 7.9 | 9.5 | 10.3 | 5.1 | 6.2 |
| TPP per unit thickness (sec/mm) | 9.5 | 11.5 | 12.0 | 13.2 | 6.9 | 7.6 |

Example 2

Papers were made from aerogel powder, aramid polymer aramid polymer fibrils, and mica. The papers had lower thermal conductivity and higher flame resistance when compared to papers having no mica or equivalent amounts of aerogel powder.

Two separate aqueous dispersions were made, using the procedure of Example 1; however, a quantity of calcined mica flake was added to the two dispersions, replacing 10 and 20 weight percent, respectively, of the aerogel powder in the two dispersions, as shown in Table 3. The mica was the muscovite type available from the Electrical Samica Flake Co., Rutland, Vt. Using the procedure of Example 1 hand-sheets were then made and tested for burn performance. All the dried papers exhibited a smooth, non-shedding surface. The composition and test results of the papers are shown in Table 3.

TABLE 3

| | Composition (nominal wt. %) | | | | |
|---|---|---|---|---|---|
| Example | Aramid Polymer Fibrils | Aerogel | Mica | TPP 2$^{nd}$ degree burn (seconds) | Thermal Conductivity (W/m-K) |
| 2-1 | 10 | 90 | — | 10.3 | 0.025 |
| 2-2 | 10 | 80 | 10 | 14.8 | 0.027 |
| 2-3 | 10 | 70 | 20 | 14.9 | 0.031 |

What is claimed is:

1. A paper suitable for use in a battery or battery pack as a flame barrier or thermal insulation, the paper comprising:
   60 to 95 weight percent aerogel powder, and
   5 to 40 weight aramid polymer fibrils;
the paper having a thickness of 50 to 4000 micrometers.

2. The paper of claim 1 further comprising mica, in an amount of 10 weight percent or more, based on the total weight of the aerogel powder, aramid polymer fibrils, and mica in the paper.

3. The paper of claim 2, wherein the aramid polymer fibrils comprise poly (paraphenylene terephthalamide).

4. The paper of claim 3 wherein the aramid polymer fibrils comprise a blend of polymers, the blend of polymers comprising 80 to 96 weight percent poly (paraphenylene terephthalamide) and 4 to 20 weight percent of poly (vinyl pyrrolidone).

5. The paper of claim 2 having a thickness of 500 to 3000 micrometers.

6. The paper of claim 2 having a tensile strength of 0.5 to 100 MPa.

7. The paper of claim 2 having a thermal conductivity of 0.015 to 0.05 W/mK.

8. The paper of claim 1, wherein the aramid polymer fibrils comprise poly (paraphenylene terephthalamide).

9. The paper of claim 8 wherein the aramid polymer fibrils comprise a blend of polymers, the blend of polymers comprising 80 to 96 weight percent poly (paraphenylene terephthalamide) and 4 to 20 weight percent of poly (vinyl pyrrolidone).

10. The paper of claim 1 having a thickness of 500 to 3000 micrometers.

11. The paper of claim 1 having a tensile strength of 0.5 to 100 MPa.

12. The paper of claim 1 having a thermal conductivity of 0.015 to 0.05 W/mK.

13. A battery cell, a battery module, or a battery pack comprising the paper of claim 1.

14. A battery cell, a battery module, or a battery pack comprising the paper of claim 2.

* * * * *